(12) United States Patent
Martin et al.

(10) Patent No.: US 9,782,944 B2
(45) Date of Patent: Oct. 10, 2017

(54) GREEN AIRCRAFT INTERIOR PANELS

(75) Inventors: Pedro P. Martin, Madrid (ES); Ana Gonzalez-Garcia, Madrid (ES); Nieves Lapena, Madrid (ES); Sergio Fita Bravo, Madrid (ES); Vicent Martinez Sanz, Madrid (ES); Ferran Marti Ferrer, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/323,790

(22) Filed: Dec. 12, 2011

(65) Prior Publication Data

US 2012/0148824 A1    Jun. 14, 2012

(30) Foreign Application Priority Data

Dec. 13, 2010  (EP) ..................................... 10382334
Nov. 11, 2011  (EP) ..................................... 11382345

(51) Int. Cl.
*C04B 28/00* (2006.01)
*C04B 28/24* (2006.01)
(Continued)

(52) U.S. Cl.
CPC .......... *B29D 99/0021* (2013.01); *B28B 19/00* (2013.01); *B29C 70/342* (2013.01);
(Continued)

(58) Field of Classification Search
CPC .... B29D 24/00; B29D 24/002; B29D 24/004; B29D 24/005; B29D 24/007;
(Continued)

(56) References Cited

U.S. PATENT DOCUMENTS

| 4,917,747 A | 4/1990 | Chin et al. |
| 5,948,706 A | 9/1999 | Riedel et al. |

(Continued)

FOREIGN PATENT DOCUMENTS

| DE | 1694556 A1 | 7/1971 |
| DE | 4226988 A1 | 2/1994 |

(Continued)

OTHER PUBLICATIONS

Weil, E., "Flame Retardants in Commercial Use or Development for Textiles" Journal of Fire Sciences, vol. 26—May 2008, pp. 243,244,269,270.*

(Continued)

*Primary Examiner* — Frank Vineis
(74) *Attorney, Agent, or Firm* — Vista IP Law Group LLP; Cynthia A. Dixon (57) ABSTRACT

The present invention relates to sandwich panels used as aircraft interior parts. In addition to provide a finishing function, the sandwich panels need to have certain mechanical properties and have sufficient fire resistance to retard the spread of fire within the vehicle interior. The present invention provides an aircraft interior panel with skins comprising natural fiber reinforced composites based either on an inorganic thermoset resin or a thermoplastic resin. Such panels provide the required flame and heat resistance, allow easy recycling and disposal, are cheaper and offer significant weight savings over conventional sandwich panels.

21 Claims, 9 Drawing Sheets

(51) Int. Cl.

| | |
|---|---|
| B29C 70/34 | (2006.01) |
| D06M 15/507 | (2006.01) |
| D06M 11/71 | (2006.01) |
| D06M 11/82 | (2006.01) |
| B29D 99/00 | (2010.01) |
| B64C 1/06 | (2006.01) |
| D06M 15/227 | (2006.01) |
| D06M 23/08 | (2006.01) |
| B28B 19/00 | (2006.01) |
| B29K 27/00 | (2006.01) |
| B29K 105/00 | (2006.01) |
| B29K 105/04 | (2006.01) |
| B29K 311/10 | (2006.01) |
| B29K 711/14 | (2006.01) |
| D06M 101/04 | (2006.01) |
| B29K 23/00 | (2006.01) |
| B29K 67/00 | (2006.01) |
| B29L 31/60 | (2006.01) |
| C04B 111/00 | (2006.01) |

(52) U.S. Cl.
CPC ............ *B29C 70/345* (2013.01); *B64C 1/066* (2013.01); *C04B 28/006* (2013.01); *C04B 28/24* (2013.01); *D06M 11/71* (2013.01); *D06M 11/82* (2013.01); *D06M 15/227* (2013.01); *D06M 15/507* (2013.01); *D06M 23/08* (2013.01); *B29K 2023/12* (2013.01); *B29K 2027/16* (2013.01); *B29K 2067/046* (2013.01); *B29K 2105/0026* (2013.01); *B29K 2105/04* (2013.01); *B29K 2311/10* (2013.01); *B29K 2711/14* (2013.01); *B29K 2715/003* (2013.01); *B29L 2031/608* (2013.01); *C04B 2111/00612* (2013.01); *C04B 2111/00982* (2013.01); *D06M 2101/04* (2013.01); *Y02P 40/165* (2015.11); *Y02T 50/433* (2013.01); *Y02T 50/46* (2013.01); *Y02W 30/97* (2015.05); *Y10T 428/24995* (2015.04); *Y10T 428/249952* (2015.04)

(58) Field of Classification Search
CPC B29D 24/008; B29D 99/001; B29D 99/0014; B29D 99/0017; B29D 99/0021; B29C 66/721; B29C 66/72941; Y02T 50/42–50/433; C04B 211/00913; C04B 211/00922; C04B 211/00931; C04B 211/00939; C04B 211/00612; D06M 15/227–5/233; D06M 2101/04–2101/08; D06M 11/82; Y02P 40/165; B29K 2023/10; B29K 2023/12; B29K 2023/14; B29K 2715/00; B29K 2715/003; B29K 2067/046; B29K 2105/04; B29K 2105/041; B29K 2105/043; B29K 2105/045; B29K 2105/046; B29K 2105/048; B29K 2105/0026; B29K 2311/10; B29K 2027/16; C08L 23/12–23/147; C08L 67/04; B29L 2031/608; B32B 2262/06–2262/067; B32B 2317/10; B32B 2317/18; B32B 2323/10; B32B 2367/10
USPC ......... 428/98, 116, 411.1, 480, 293.4, 294.1, 428/294.7, 297.4–319.9
See application file for complete search history.

(56) References Cited

U.S. PATENT DOCUMENTS

| | | | |
|---|---|---|---|
| 6,419,776 B1 | 7/2002 | Hoopingarner et al. | |
| 6,992,027 B1* | 1/2006 | Buckingham | B32B 5/26 428/920 |
| 2005/0287383 A1* | 12/2005 | Taylor et al. | 428/500 |
| 2007/0072979 A1* | 3/2007 | Moad | C08L 23/10 524/445 |
| 2007/0110976 A1 | 5/2007 | Pastore et al. | |
| 2007/0190876 A1* | 8/2007 | Ogawa et al. | 442/136 |
| 2007/0232176 A1 | 10/2007 | Cashin et al. | |
| 2008/0073465 A1* | 3/2008 | Veihelmann et al. | 244/133 |
| 2009/0069463 A1* | 3/2009 | Serizawa et al. | 524/9 |
| 2009/0072086 A1* | 3/2009 | Smith et al. | 244/119 |
| 2009/0156073 A1* | 6/2009 | Schubert | C09K 21/06 442/140 |
| 2010/0125112 A1* | 5/2010 | Chung | C08J 5/045 523/205 |
| 2011/0092622 A1* | 4/2011 | Kaneda | C08K 5/34928 524/100 |

FOREIGN PATENT DOCUMENTS

| | | | | |
|---|---|---|---|---|
| DE | 29900621 U1 | 4/1999 | | |
| DE | 29900621 U1 | 5/1999 | | |
| EP | 1493543 A2 | 1/2005 | | |
| EP | 1988118 A1 | 11/2008 | | |
| EP | 2047983 A1 | 4/2009 | | |
| EP | 2182138 A1 | 5/2010 | | |
| JP | S52-065014 U | 5/1977 | | |
| JP | 7-239197 A | 9/1995 | | |
| JP | H7-329197 A | 9/1995 | | |
| JP | 10-158524 A | 6/1998 | | |
| JP | H10-158524 A | 6/1998 | | |
| JP | 2002-225210 A | 8/2002 | | |
| JP | 2005-9028 A | 1/2005 | | |
| JP | 2005-009028 A | 1/2005 | | |
| JP | 2006-2869 A | 1/2006 | | |
| JP | 4425910 B | 12/2009 | | |
| JP | WO 2009153934 A1 * | 12/2009 | | C08K 5/34928 |
| JP | 4425910 B | 3/2010 | | |
| JP | 2010-095943 A | 4/2010 | | |
| JP | 2010-95943 A | 4/2010 | | |
| JP | 2010-121131 A | 6/2010 | | |
| WO | 02/38381 A1 | 5/2002 | | |
| WO | 2006065995 A2 | 6/2006 | | |

OTHER PUBLICATIONS

John, M., Bio-based structural composite materials for aerospace applications, South African International Aerospace Symposium, Dec. 2, 2008.*
Zotek, High Performance PVDF Foams, https://web.archive.org/web/20080901000000*/http://www.zotefoams.com/downloads/ZOTEK-F_aircraft-EN.pdf, Nov. 13, 2008.*
Nam, S, Effect of urea additive on the thermal decomposition kinetics of flame retardant greige cotton nonwoven fabric, Polymer Degradation and Stability, vol. 97, Issue 5, May 2012, pp. 738-746, ISSN 0141-3910, http://dx.doi.org/10.1016/j.polymdegradstab.2012.0.*
Extended European Search Report for Patent Application No. EP 10382334.0, Applicant: The Boeing Company, dated Jun. 22, 2011 (8 pages).
European Search Report, Application No. 11382345.4-1706 / 2463083, Jan. 20, 2014.
Office Action from Japanese Patent Office for corresponding Japanese Patent Application No. 2011-265430, prepared on Aug. 25, 2015.
Office Action from Chinese Patent Office for corresponding Chinese Patent Application No. 201110437962.X, prepared on Nov. 9, 2015.
Industrial Applications of Natural Fibre Reinforced Composites, Edited by Xie Wei, Fiber Reinforced Plastics, pp. 31-35, Issue 2 of 2009, Jun. 2009.

(56) References Cited

OTHER PUBLICATIONS

Office Action from Chinese Patent Office for corresponding Chinese Patent Application No. 201110437962.X, dated Apr. 25, 2016.
R.D. Anandjiwala et al., "Bio-based structural composite materials for aerospace applications", 2nd SAIAS Symposium, pp. 1-6, (refer to last paragraph on p. 1 to last paragraph on p. 4), Sep. 14-16, 2008.
Notice of Reasons for Rejection dated Aug. 25, 2015 in Japanese Patent Appl. No. 2011-265430 (13pages).
Decision of Rejection dated Mar. 23, 2016 in Japanese Patent Appl. No. 2011-265430 (6pages).

* cited by examiner

|  | S01 | S02 | S03 | Average |
|---|---|---|---|---|
| Fibre: | | | | |
| Initial mass of fibre (g) | 31.2 | 30.2 | 30.5 | 30.6 |
| Final mass fibres + boron derivate flame retardant (g) | 41.7 | 40.1 | 40.8 | 40.9 |
| % wt boron derivate flame retardant | 25.2 % | 24.7 % | 25.2 % | 25.0 % |
| Composite: | | | | |
| Resin mass (g) | 73.4 | 73.4 | 73.4 | 73.4 |
| Hardener mass (g) | 11.0 | 11.0 | 11.0 | 11.0 |
| % wt hardener | 13.0 % | 13.0 % | 13.0 % | 13.0 % |
| Total mass (dry) (g) | 107.5 | 100.1 | 101.2 | 102.9 |
| % wt fibre (dry) | 29.0 % | 30.2 % | 30.1 % | 29.8 % |
| % wt boron derivate flame retardant (dry) | 9.8 % | 9.9 % | 10.2 % | 10.0 % |
| Maximum heat release rate (kW*m$^{-2}$) | 34.2 | 27.0 | 28.7 | 30.0 |
| Total heat release during the first 2 min (kW*min*m$^{-2}$) | -8.3 | -6.5 | -6.5 | -7.1 |

| | P7 | P8 | P9 | P10 |
|---|---|---|---|---|
| Fibre: | | | | |
| Initial mass of fibre (g) | 25.0 | 24.9 | 25.0 | 12.5 |
| Number of fibre layers | 4 | 4 | 4 | 2 |
| Final mass fibres + boron derivate flame retardant (g) | 14.1 | 13.6 | 13.1 | 6.4 |
| % wt boron derivate flame retardant | 36.0 | 35.2 | 34.3 | 33.7 |
| | | | | |
| Composite: | | | | |
| Resin mass (g) | 73.6 | 73.6 | 73.6 | 36.8 |
| Hardener mass (g) | 11.0 | 11.0 | 11.0 | 5.5 |
| % wt hardener | 13.0 | 13.0 | 13.0 | 13.0 |
| Foam weight (g) | 2.3 | 2.3 | 2.3 | 2.3 |
| | | | | |
| Total mass (dry) (g) | 103.8 | 98.7 | 101.0 | 50.2 |
| % wt fibre (dry) | 24.1 | 25.3 | 24.8 | 25.0 |
| % wt boron derivate flame retardant (dry) | 13.6 | 13.7 | 13.0 | 12.8 |
| | | | | |
| Maximum heat release rate (kW*m$^{-2}$) | 17.3 | 14.3 | 16.0 | 9.2 |
| Total heat release during the first 2 min (kW*min*m$^{-2}$) | 0.2 | 0.4 | -0.2 | -1.7 |

GREEN AIRCRAFT INTERIOR PANELS

CROSS-REFERENCE TO RELATED APPLICATIONS

This application claims priority to and the benefit of European Patent Application No. EP 10382334.0, filed on Dec. 13, 2010, the entire disclosure of which is expressly incorporated by reference herein. This application also claims priority to and the benefit of European Patent Application No. EP 11382345.4, filed on Nov. 11, 2011, the entire disclosure of which is expressly incorporated by reference herein.

FIELD

The present invention relates to aircraft interior panels comprising a sandwich panel structure. The aircraft interior panels may be used in applications like floors, ceilings, sidewalls and stowage bins.

BACKGROUND

Sandwich panels are used in many aircraft interior applications, such as floors, sidewalls, ceilings and stowage compartments. These types of sandwich panels may be used in similar applications in other types of transport vehicles. In addition to providing a finishing function, the sandwich panels need to have certain mechanical properties and have sufficient fire resistance to retard the spread of fire within the vehicle interior.

Of particular interest to the applicant is the use of sandwich panels in aircraft interiors. Consequently, the following description focuses on the application of novel "green", or environmentally friendly, sandwich panels in aircraft interiors. It will be abundantly clear that the present invention may extend to sandwich panels in general having the composition of the aircraft interior panels according to the claims. Such general sandwich panels enjoy far greater applicability than just aircraft interiors and would not require any modification.

Current aircraft interior panels are sandwich structures comprising a core sandwiched between outer skins. The materials used in these panels are chosen primarily for their fire resistant properties. For commercial airlines, there are strict regulations governing the fire resistant properties of the materials used in the cabin, along with limits as to the heat and smoke released during combustion of such materials. This has led to the widespread use of glass fibre-reinforced composites based on phenolic resins in conventional aircraft interior parts. In addition to their appropriate fire resistance, the panels based on these composite materials may be moulded into complex shapes, they have a high strength-to-weight ratio, have low maintenance costs and are generally easily installed.

In general, phenolic resins and glass fibre pre-pregs comprise the outer skins of such panels. Alternatively, skins may be made from a composite of glass fibre with epoxy or carbon fibre with epoxy. All these skin materials have known limitations. Phenolic resins are regarded as highly noxious and can cause skin problems, such as dermatitis. Glass fibres cause irritation of the skin, eyes and upper respiratory system producing skin eruption similar in appearance to poison ivy, pneumoconiosis and silicosis. If ingested, glass fibres can also cause gastrointestinal conditions.

The core of a conventional panel is usually formed from a Nomex® honeycomb that contains aramid fibres. These fibres are a heat-resistant synthetic fibre, but have a known disadvantage in that upon fracturing, they produce small fibrils that are harmful to the lungs and cause skin irritation.

The use of such noxious skin and core materials presents difficulties during manufacturing, while heating the resins and where fibres may be exposed after curing, such that careful handling is required. Personal protective equipment is therefore required during manufacturing such panels. This does not apply once the part is made and installed on the aircraft. However, more significant issues arise at the end of the service life of the aircraft where it is scrapped and parts are disposed of. This is of course true for removal and disposal of interior panels at any stage of the aircraft's life, for example during a refit or conversion process. Moreover, the noxious nature of the materials makes the panels poor candidates for recycling and so often end up being sent for burial at landfill. They do not leach but still constitute harmful residues. This is contrary to the aerospace industries current drive for products that achieve a better environmental performance.

The ideal situation would therefore be that in which the sandwich panels are more environmentally friendly while maintaining an excellent technical performance. For example, sandwich panels that are easier to recycle would be extremely advantageous.

SUMMARY

Against this background and from a first aspect, the present invention resides in an aircraft interior panel comprising a core sandwiched between first and second skins, wherein the first and second skins both comprise natural fibres and a resin. The natural fibres may be a natural fibre fabric. The first and second skins may comprise outer skins.

The use of natural fibres provides significant "green" benefits in terms of ease of recycling and disposal, and also offers other advantages such as reduced weight and lower cost as will be described in more detail below.

In order to improve the performance of the sandwich panel in the event of a fire, the natural fibres may be treated with a flame retardant prior to them being formed into the skins. A non-halogenated fire retardant may be used, such as a boron derivative, e.g., disodium octaborate tetrahydrate ($Na_2B_8O_{13} \cdot 4H_2O$). Phosphate nano-particles and/or nano-graphene may also be used as a fire retardant to coat the fibres.

Although many types of natural fibres may be used, flax is currently one of the preferred choices.

Optionally, the resin is an inorganic thermoset resin, for example an aluminium silicate derivative such as a (potassium, calcium)-poly(sialate-siloxo) of the —Si—O—Al—O—Si—O— type, with different Si:Al atomic ratio in the poly(sialate) structure. The resin may comprise components such as any, and any combination of, a hardener and an anti-shrinkage additive. Suitable choices for the hardener include aluminium and copper phosphate mixtures, and suitable choices for the anti-shrinkage additive include an aluminium silicate derived compound and hollow glass micro-spheres.

The resin may also be a thermoplastic resin such as a polypropylene resin or a polylactic acid resin. The resin may be used in a matrix further comprising a fire retardant. Suitable choices for the fire retardant in a polypropylene resin matrix include ammonium polyphosphate optionally as nano-particles, and nano-graphene. Suitable choices for the fire retardant in a polylactic acid resin matrix include ammonium polyphosphate, optionally as nano-particles, zinc borate and nano-graphene.

The aircraft interior panel may comprise a flame retardant protective coating on an outer surface of at least one of the first and second skins. Optionally, a protective coating comprising sodium silicate nano-particles encapsulated in aluminium nano-particles is provided on the first skin and/or the second skin when formed from polypropylene resin. Optionally, a protective coating comprising nano-particles of phosphates, ammonium salts, nanographene, carbonate, sodium silicate and acrylic resin is provided on the first skin and/or the second skin when formed from polylactic acid resin.

Optionally, the core may comprise balsa wood, with or without fire resistance. Balsa wood is a natural product that is extremely easy to handle in terms of disposal and recycling. The core may contain a paper honeycomb. The core may comprise a thermoplastic foam. In some embodiments, the core comprises combinations of balsa wood, paper honeycomb and a thermoplastic foam. Where a thermoplastic foam is present, it is preferably fire resistant, like a polyvinylidene fluoride (PVDF) foam, a Polyetherimide-based (PEI) foam or others. An advantage of using a foam over the conventional honeycomb structure might be enhanced soundproofing. When used in aircraft interiors, this might provide a quieter, more pleasant environment for passengers.

The core and/or skins may have been treated to improve adhesion, for example adhesion between the core and skins or between the skins and protective coating. For example, the core and/or skins may have been subjected to a dielectric barrier discharge treatment to activate one or more surfaces for improved adhesion. For example, atmospheric pressure air dielectric barrier discharge, or other surface activation mechanisms, may be used for this purpose. Optionally, chemical etching may be used to treat the core and/or skins for enhanced adhesion.

For certain applications, aircraft interior panels may comprise more than three layers. For example, in addition to the core, first skin and second skin, the aircraft interior panel may comprise further skins or further cores, or both further skins and cores, or other layers. Other layers may include conventional finishes for decorative purposes or fire retardant coatings. The core may be sandwiched between the first and second skins in all configurations, with first and second skins being arranged outermost in the aircraft interior panel, i.e., the first and second skins provide the outer surfaces of the aircraft interior panel.

The aircraft interior panels described above avoid the use of noxious materials. Put another way, the aircraft interior panels may comprise only natural materials or the aircraft interior panels may not comprise noxious materials. As a result, handling during manufacturing, recycling or disposal of the aircraft interior panels is much easier and cheaper. For example, when present in an aircraft that has reached the end of its service life, the green aircraft interior panels may be removed and recycled or disposed without stringent requirements for protecting those working on the aircraft due to the absence of noxious materials that would require special handling.

Importantly, the aircraft interior panels as constructed above may achieve or even exceed the mechanical and fire resistance properties of conventional aircraft interior panels without incurring any weight penalty. For example, aircraft interior panels constructed as described above pass the Ohio State University (OSU) test according to FAA and EASA requirements with lower or similar heat release rate values than the conventional sandwich panels. Furthermore, the aircraft interior panels provide the required low levels of heat and smoke production upon combustion. Their performance complies with, and may even exceed, the certification requirements imposed on civil airliners.

A further advantage of aircraft interior panels according to the present invention is that conventional manufacturing processes may be used in their construction, and hence conversion costs may be avoided.

Also, natural fibres are typically 45% to 80% cheaper than glass fibres.

In addition to the above, there is a further significant benefit to be gained from aircraft interior panels according to the present invention. This is because the green aircraft interior panels are generally much lighter than conventional panels. For example, an aircraft interior panel according to the present invention of the same size and configuration as a conventional panel will weigh far less. This weight saving is gained mostly from the use of natural fibres instead of glass fibres: glass fibres have a typical density of ~2.6 $g/cm^3$, whereas flax fibres have a typical density of ~1.5 $g/cm^3$. This advantage is particularly significant in commercial airliners where the overall interiors weight could be reduced by 15%-30% when using the thermoplastic and the inorganic resin-based panels, respectively. Weight reduction in aircraft is always a high priority, particularly for airlines. This is because the reduced weight leads to a reduced fuel consumption. This provides important cost savings to the airlines in reduced fuel costs, and also brings significant environmental advantages with the reduction in $CO_2$ emissions.

It has been estimated that each kg of weight reduction in a typical commercial airliner provides a reduction of 0.02 kg to 0.04 kg of fuel burn per hour. Assuming a typical life of 100,000 hours for an airliner, then for every single kilogram of weight saved, a fuel burn reduction of 4 tonnes and a reduction in $CO_2$ emissions of 12.5 tonnes is achieved over the working life of the airliner. A typical airliner that uses aircraft interior panels according to the present invention for a typical arrangement of ceilings, floors, sidewalls, bulkheads, stowage compartments and other parts in the cabin could see a weight reduction of 200 to 500 kg for panels made of the inorganic resin and 100 kg to 250 kg for the panels made of the thermoplastic resin. The weight reduction also equates to 2,500 to 6,500 tonnes reduction in $CO_2$ emissions during the lifetime of the airliner for panels made of the inorganic resin and 1,300 to 3,250 tonnes reduction in $CO_2$ emissions during the lifetime of the airliner for panels made of the thermoplastic resin. Moreover, further $CO_2$ savings could be achieved at end of the service life due to easier recycling and disposal of the sandwich panels.

In addition, for the particular case of the thermoplastic resins, the energy to produce a kg of polylactic acid is 40 MJ and 77 MJ for polypropylene. This is to be compared with 139 MJ/kg of a phenolic resin or 140 MJ/kg of epoxy resin. This means energy savings in between 5,000 and 20,000 GJ per year if all the epoxy-based panels are replaced by thermoplastic-based ones. On the other hand, life-cycle impact studies show that natural fibers in a composite panel give a 66% reduction in the environmental impact compared to glass fibers (the energy to manufacture natural fibers represents only one third or less of that of glass fibres). If the panel contains 40% of natural fibers instead of glass fibres, energy savings in between 900 and 2,000 GJ per year can be achieved. Additional environmental benefits, such as reduced particle and gas emissions, can be achieved due to the lower environmental impact during the production of natural fibres and thermoplastic matrices compared to the glass fibre reinforced thermoset composites. Therefore, the replacement of epoxy-based composites by thermoplastic composites will avoid the generation of huge amounts of hazardous waste from aircraft interiors that currently may only be disposed by incineration, generating $CO_2$ emissions, or by landfill. The latest panels do not really eliminate the waste due to the lake of degradability of these materials, but increase the amount of noxious substances released to the environment. However the thermoplastics panel can be recycled and used for several further applications such as pallets, wood plastic applications, insulating elements, etc.

The present invention also extends to an aircraft including any of the aircraft interior panels described above.

The present invention also extends to a method of manufacturing any of the aircraft interior panels described above, comprising curing a stack of the natural fibre fabrics, the resin and the core to form the aircraft interior panel.

The aircraft interior panel may be formed in a single step, in two steps or in more than two steps. For example, the first and second skins may first be formed, and then joined to the core in a second step. As such, the method may comprise laying up the natural fibre fabrics, impregnating the fabrics with the resin, curing the skins, laying up the core between the skins to form a stack, and curing the stack to form the aircraft interior panel. Alternatively, in a one-step process, the method may comprise laying up the natural fibre fabrics on the core, adding the resin to form the stack, and curing the stack in one step to form the aircraft interior panel. Any of the above curing steps may be performed using a vacuum bag process. For example, the vacuum bag process may comprise curing for 30 min to 24 hours without vacuum pumping to prevent the elimination of water during the polymerization of the inorganic thermoset resin. This may be performed at a temperature range of 25-80 degrees Centigrade. Pressure may be applied (using the atmospheric pressure, by a mechanical press or with an autoclave) to compact the assembly. These steps may be followed by curing the inorganic thermoset at room temperature with vacuum pumping until constant weight is achieved. This final step has been found to remove the water once the inorganic thermoset resin has polymerized. While these steps are preferred for manufacture using an inorganic thermoset resin, they may also be used when employing a thermoplastic resin. An additional step of adding a protective coating may be included.

The precursors of the resin may include any of and any combination of: a hardener, and an anti-shrinkage additive. The resin may include an aluminium silicate derivative, optionally with different Al:Si ratios. The anti-shrinkage additive may include an alumino-silicate derived compound or hollow glass microspheres or others. The resin might also be a thermoplastic resin such as a polypropylene resin or a polylactic acid resin. The manufacturing process for the thermoplastic-based panels is detailed later on.

The method may further comprise immersing the natural fibre fabrics in a flame retardant solution. This step may be performed prior to reinforcing the resin with the natural fibre fabrics. The flame retardant may be a boron derivative. The natural fibres may be immersed in a solution of flame retardant at 25 to 80 degrees Centigrade for 20 to 80 minutes, and then dried at room temperature. Fire retardants may be added to the resin.

Optionally, the method may further comprise adding an adhesive between the skins and the core, or treating the core to activate its surface to improve adhesion of the core to the skins. For example, one or more surfaces of the core may be activated using the following method or using any other surface activation treatment. The method may comprise treating the core using a dielectric barrier discharge. This may be done by placing the core on a platen between electrodes and applying an alternating high voltage current. The skins may be treated to improve adhesion of a fire retardant protective coating, for example using chemical etching.

When using the thermoplastic resin to build up the panels, the equipment and processes are also compatible with those used for manufacturing conventional interior parts. The panel's outer skins may be produced previously using a standard compounding setup for thermoplastic sheets production (e.g., 200° C./1 min for the polypropylene sheets, and 140° C./1 min for the polylactic acid based panels). The thermoplastic sheets, the natural fibres, the adhesives and the core may then be sandwiched using a hot-plate press (e.g., 100° C./1 min and the applied force may be 87 KN for both types of panels), following a process similar to the crush core manufacturing method currently used for interior parts production. The outermost skin may include the flame retardant coating that may be applied using conventional painting equipment. Additional finishing layers may be applied following the same processes as those employed currently for the production of conventional panels. Advantageously, no additional investment is needed to produce the novel green panels, rather than the existing facilities for manufacturing conventional panels.

For the thermoplastic-based panel assembly, the skins may be bonded to the sandwich core using a fire resistant polyurethane-based adhesive. The polyurethane-based adhesives have been found to be the most convenient solution for the configurations tested, but are not the only option to bond the skins and the core. Alternative formulations and adhesive types such as epoxy-based adhesives may be used depending on the final properties required for the application.

The core of the sandwich panels may be either a fireproof paper honeycomb, balsa wood or a fire resistant thermoplastic foam. The type of core used may be selected according to the properties required for the aircraft interior panel. The panels tested with these cores have shown good results in terms of fire resistance.

Regarding the protective coating, once the panel is assembled, the final protective coating may be applied on a skin, preferably the outermost skin. This protective coating increases the fire resistance of the aircraft interior panels, acting as a barrier against fire. The compositions of this coating may be selected according to the type of skin being used, and may vary between panels based on polypropylene and polylactic acid.

As a first step prior to applying the protective coating, the skin's surface may be activated by chemical etching. This process allows optimizing the adherence of the protective coating to the surface.

The protective coating developed for the polypropylene-based panels may comprise sodium silicate nano-particles encapsulated with alumina nanoparticles (10%). The protective coating may be applied by manual impregnation of the surface of the skin with a solution of the nano-particles. A first layer may be applied on the surface and dried in an oven for 10 minutes at 40° C. Then a second layer (in the same side and so, same outer skin) may be applied and dried again in the oven for 30 min at 40° C. The protective coating developed for the polylactic acid-based panels may be made of nano-particles of phosphates, ammonium salts, nanographene, carbonate, and sodium silicate. Additionally, a small quantity of acrylic resin may be added to the mixture of nano-particles to improve the flexibility, the adherence and thermal stability of the coating. The coating may be manually applied to the skin of the aircraft interior panel in a similar way to the method used for the polypropylene based panels.

The features, functions, and advantages can be achieved independently in various embodiments of the present inventions or may be combined in yet other embodiments.

DRAWINGS

In order that the present invention may be more readily understood, preferred embodiments will now be described, by way of example only, with reference to the following drawings in which.

DESCRIPTION

Figure 1:
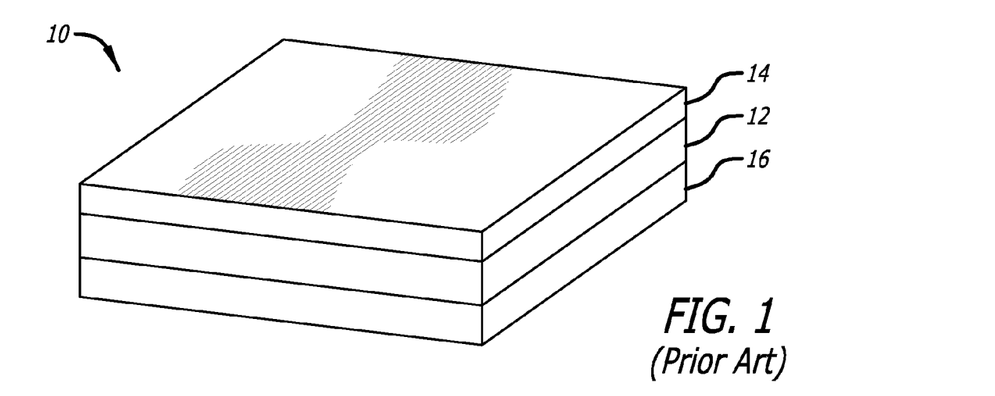
FIG. 1 is a perspective view of an aircraft interior panel according to the prior art.

According to the prior art, an aircraft interior panel 10 comprises three layers, as shown in FIG. 1. The middle layer is a core 12 made of a Nomex® honeycomb structure. The core 12 is sandwiched between an upper skin 14 and a lower skin 16. Both upper and lower skins 14, 16 comprise a phenolic resin and glass fibre pre-preg. The skin layers 14, 16 are bonded to the core 12 using the phenolic resin present in the pre-preg, which acts as an adhesive.

Figure 2:
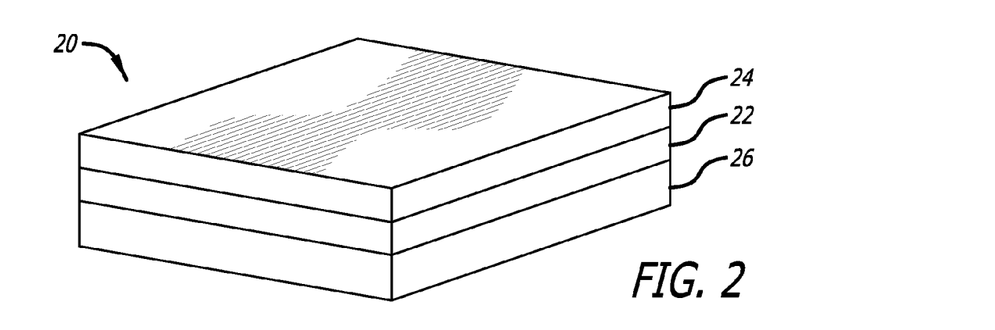
FIG. 2 is a perspective view of a green aircraft interior panel according to a first embodiment of the current invention.

FIG. 2 shows a green aircraft interior panel 20 according to a first embodiment of the present invention. The green aircraft interior panel 20 comprises a core 22 sandwiched between an upper skin 24 and a lower skin 26. In contrast to the aircraft interior panel 10 of FIG. 1, the materials used in the panel 20 of FIG. 2 are environmentally friendly.

The core 22 is a PVDF foam, typically a few mm thick. In alternative embodiments, the core 22 may comprise balsa wood or a paper honeycomb. Joined to the core 22 are the corresponding upper and lower outer skins 24, 26. Each skin 24, 26 comprises a natural composite material made from natural fibres set within resin, an inorganic thermoset resin in this embodiment. Embodiments using thermoplastic resins are described later. In this embodiment, there is only one layer of flax fibres that is impregnated with an aluminium silicate derivative resin. The inorganic thermoset resin has excellent heat resistant properties and can withstand temperatures of up to 1000 degrees Centigrade. The heat resistance of natural fibres does not tend to be as good, so they may be treated with a flame retardant, as will be described in more detail with respect to some of the methods of manufacture according to the present invention (see, for example, FIG. 5 and the corresponding description).

The present invention is not limited to aircraft interior panel structures comprising only three layers. More than a single core layer may be included, and more than a single skin layer may be included to any one side of the core.

Figure 3:
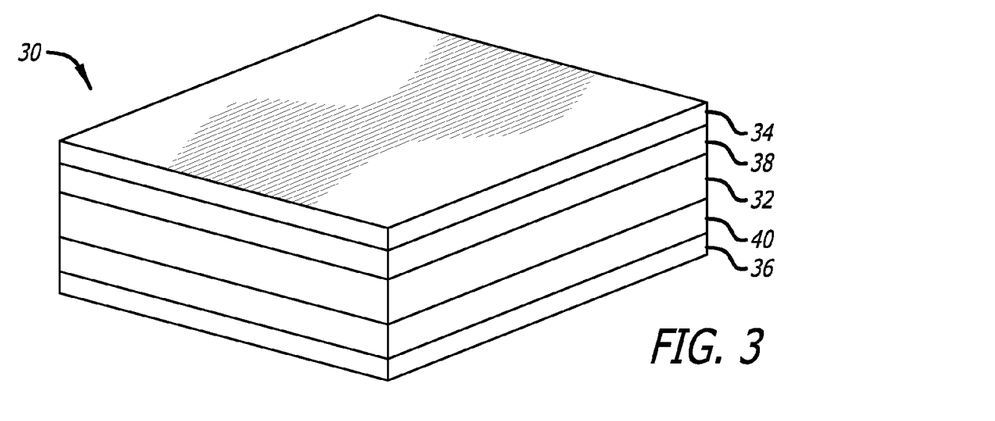
FIG. 3 is a perspective view of a green aircraft interior panel according to a second embodiment of the present invention.

An example of a further green aircraft interior panel 30 is shown in FIG. 3. The aircraft interior panel 30 comprises five layers that are stacked as follows, from top to bottom: an outer upper skin 34, an inner upper skin 38, a core 32, an inner lower skin 40 and an outer lower skin 36. The core 32 corresponds to the core 22 described with respect to FIG. 2. Also, the skins 34, 36, 38, 40 correspond to the skins 24, 26 described with respect to FIG. 2. Pairs of upper and lower skins 34, 38 and 36, 40 may be provided to increase strength. The skins may be laid up in an aligned manner, or with their plies rotated (e.g., the warp and weft of the outer upper skin 34 may have its warp and weft rotated through 90 degrees relative to those of the inner upper skin 38).

Methods of manufacture of aircraft interior panels according to the present invention will now be described. For the sake of simplicity, three-layer green aircraft interior panels will be described although it will be readily appreciated that the method may be simply extended to panels having more than three layers.

Figure 4:
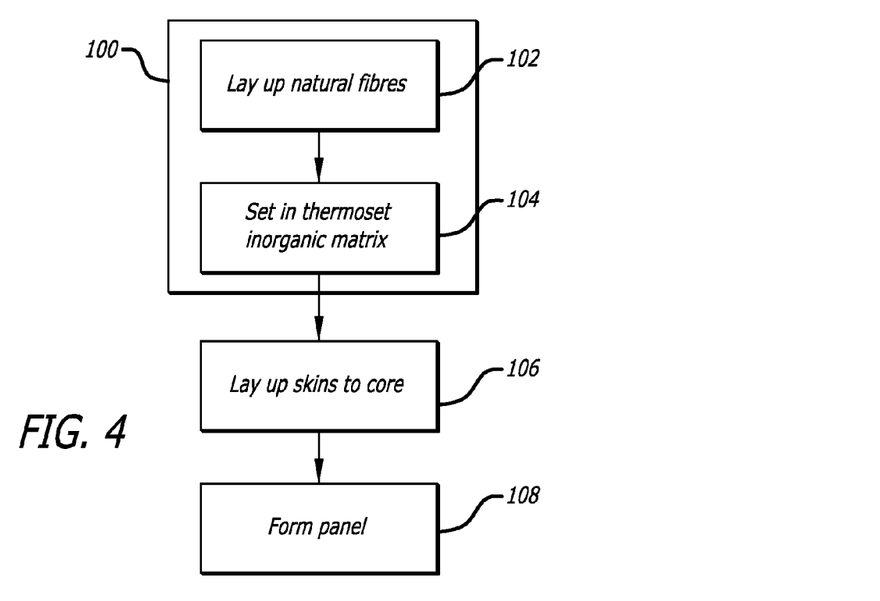
FIG. 4 is a schematic representation of a method of assembling a green aircraft interior panel according to a first embodiment of the method of the present invention.

A simple method of manufacture is shown in FIG. 4. At 100, skins 24, 26 are formed. This step 100 comprises laying up natural fibre fabrics, as indicated at 102. For example, one layer of flax fabric is laid up for each skin 24, 26. At 104, a thermoset inorganic resin impregnates the natural fibres and the skins are formed 24, 26 by curing the mixture. For example, an aluminium silicate derivative is used as the inorganic thermoset resin and may be mixed with a hardener. In addition, an anti-shrinkage additive may be used. The aluminium silicate derived compound used as filler added in a 1 to 15% by weight has been found to work well. The natural fibre fabric impregnated with the thermoset resin may be introduced into a vacuum bag and vacuum pumped to extract the air. The skin is cured for a period in between 30 min to 24 hours without vacuum pumping, at a temperature in the range of 25 to 80 degrees Centigrade, under atmospheric pressure or pressurized in mechanical press or in an autoclave to compact the composite. This may be followed by curing at room temperature until constant weight is achieved, with vacuum pumping to remove water from the composite.

With the skins 24, 26 formed in this manner, they are laid up on both sides of the core 22, as shown at step 106. A skin 24, 26 is placed on each side of the core 22, applying an adhesive between the skin and the core surface. Environmentally friendly adhesives (low volatile organic compounds) have been found to work well. In this embodiment, the core 22 comprises a PVDF foam. At 108, the complete sandwich panel 20 may be formed by curing the adhesive in a low temperature vacuum bag process, under atmospheric pressure, or pressurized in a mechanical press or in an autoclave to compact the panel 20.

Figure 5:
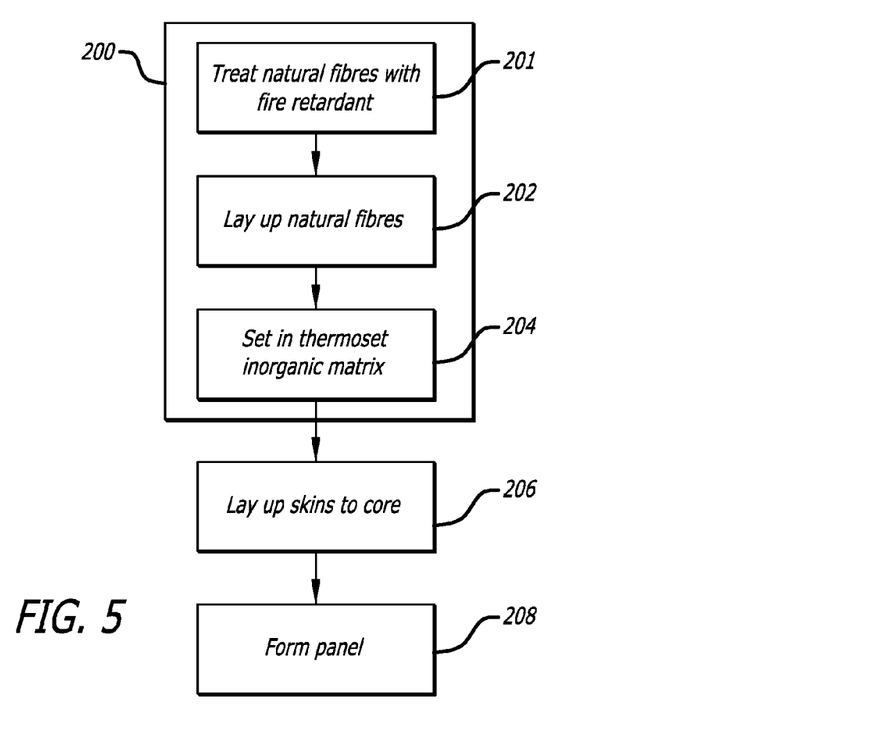
FIG. 5 is a schematic representation of a method of assembling a green aircraft interior panel according to a second embodiment of the method of the present invention.

FIG. 5 shows a further embodiment of a method of manufacture according to the present invention. At 200, skins 24, 26 are formed. A first step 201 comprises treating the natural fibres with fire retardant. For example, natural fibres may be formed into fabrics and immersed in a concentrated solution of fire retardant at 25-80 degrees Centigrade for 20 to 80 minutes. The soaked natural fibre fabrics may then be dried at room temperature by hanging the fabrics vertically until they achieve a constant weight. It has been found that the natural fibres made this way retain 10% to 30% of flame retardant by weight.

The method then continues in much the same way as previously described with respect to FIG. 4. The treated natural fibres are laid up at 202, and impregnated with a thermoset inorganic resin at 204. The thus-formed skins 24, 26 are bonded with the core 22 at 206, and formed into the finished aircraft interior panel 20 at 208.

The methods of manufacture described with respect to FIGS. 4 and 5 comprise a two-stage panel assembly process, where the skins 24, 26 are first formed and then the complete aircraft interior panel 20 is assembled. However, any of these methods may be modified to use a one-step formation process where the skins 24, 26 and complete panel 20 are cured in just a single process.

Figure 6:
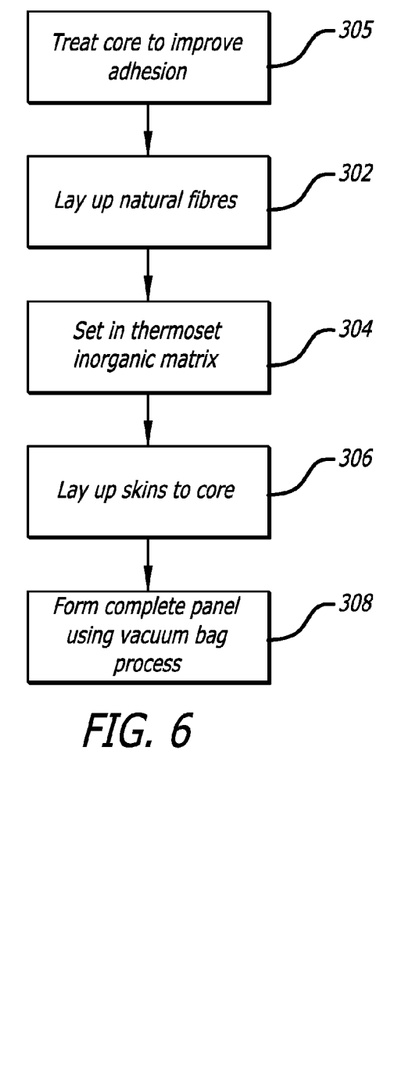
FIG. 6 is a schematic representation of a method of assembling a green aircraft interior panel according to a third embodiment of the method of the present invention.

For example, FIG. 6 shows the method of FIG. 4 adapted to use a single step of curing. At step 305, the surface of the core 22 is activated to improve the adhesion between the core 22 and the skins 24, 26. The treatment may comprise exposing the PVDF core 22 to an atmospheric pressure air dielectric barrier discharge (DBD). The DBD reactor may be equipped with a sinusoidal waveform high voltage alternating current power supply, operating at 40 to 80 Hz. The output power and impedance of the operational working load are variable and controllable. The discharge may be generated between stationary electrodes and a sliding platen on which the foam core 22 is mounted. The electrodes may be formed from steel rods around which are wound 1.5 mm diameter bare stainless steel wire. The platen may be 10 mm thick and may have a silicon-rubber coating. Four cycles at 0.87 kW power and a speed of 40 m per minute might be used, equivalent to a power density of 4.9 W/cm$^2$. This treatment has been found to activate the surfaces of the core 22 making them more chemically reactive such that adhesion between the core 22 and the skins 24, 26 is significantly improved.

At 302, natural fibre fabrics like those described above are laid up. A thermoset resin, like that described above, impregnates the two natural fibre fabrics, as indicated in step 304. At 306, one fibre fabric is laid up on one side of the core 22 with the other fibre fabric being laid up on the other side of the core 22. The aircraft interior panel 20 is then assembled in a single step at 308 using a vacuum bag process. In such a way the composite skins 24, 26 form and bond to the core in just a single step. The panel 20 may be introduced into a vacuum bag and vacuum pumped to extract the air. The panel 20 may then be cured for 30 min to 24 hours without vacuum pumping at 25-80 degrees Centigrade under atmospheric pressure or pressurized in a mechanical press or in an autoclave to improve the composite consolidation. This may be followed by curing at room temperature until constant weight is achieved, with vacuum pumping to remove water from the composite.

Figure 7:
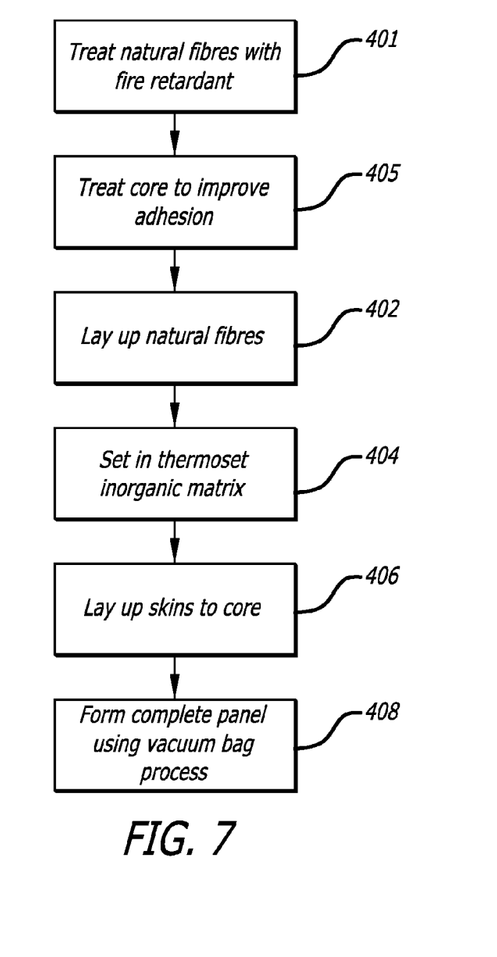
FIG. 7 is a schematic representation of a method of assembling a green aircraft interior panel according to a fourth embodiment of the method of the present invention.

FIG. 7 shows an adaptation of FIG. 5 as a single cure process. At 401, the natural fibre fabrics are treated with the flame retardant, as previously described. At 405, the core is treated with DBD, as previously described. The treated fibre fabrics are then laid up as indicated at step 402 and a thermoset inorganic resin, like those described above, impregnates the fibre fabrics at step 404. At 406, one fibre fabric is laid up on one side of the core 22 and the other fibre fabric is laid up on the other side of the core 22. The complete aircraft interior panel 20 is then formed in a single step using a vacuum bag process, as indicated at 408.

In addition to FIGS. 6 and 7, it will now be readily understood that the methods of the previous Figures may be adapted to use a single curing step in a similar fashion, as too can other variants of the general method.

FIG. 2 shows an aircraft interior panel 20 having upper skin 24 and lower skin 26 formed from an inorganic thermoset resin. Embodiments using thermoplastic resins will now be described, along with example methods of manufacture.

Figure 8:
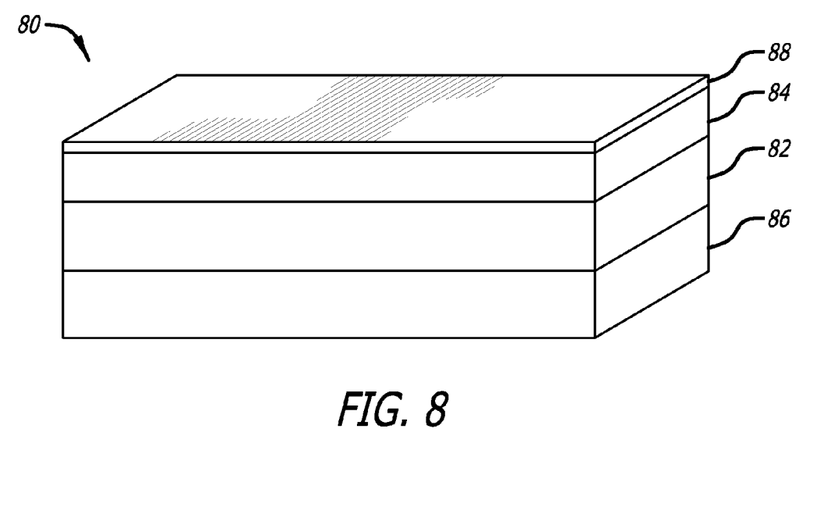
FIG. 8 is a perspective view of a green aircraft interior panel according to a third embodiment of the current invention.

FIG. 8 shows an aircraft interior panel 80 comprising a sandwich structure. A core 82 is sandwiched between an upper skin 84 and a lower skin 86. Upper skin is provided with a protective coating 88.

The core 82 comprises a fire resistant thermoplastic foam. The core 82 may have a thickness of 4 to 5 mm. In alternative embodiments, the core 82 comprises a paper honeycomb. Paper honeycomb cores may have a thickness of 10 mm, or even greater.

The upper skin 84 and lower skin 86 are of corresponding construction. They both comprise natural fibres, such as flax, set within a thermoplastic resin. The natural fibres may be as previously described with respect to FIGS. 2 and 3. The thermoplastic resin used in the embodiment of FIG. 8 is polypropylene.

The composite matrix may be modified with a non-halogenated flame retardant. For example, ammonium polyphosphate (50% concentration) and nanographene (5% concentration) may be added to the polypropylene matrix. Compatibilizers may be added to improve the incorporation of the flame retardants into the matrix. In addition, the natural fibres may be treated with a flame retardant, namely non-halogenated nano-particle flame retardants such as nano-phosphates thereby forming a protective coating over the natural fibres.

In the embodiment of FIG. 8, the upper skin 84 is provided with a protective coating 88. In alternative embodiments, lower skin 86 is also provided with a protective coating 88. The protective coating 88 may be a fireproof nano-coating. Where applied to only one skin 84 or 86, this skin 84 or 86 will be the cabin-side skin when the aircraft interior panel 80 is installed in an aircraft.

The protective coating 88 is applied to the upper skin 84 that is formed from a polypropylene resin. The protective coating 88 comprises two protective layers although, for the purposes of clarity, only a single layer is shown in FIG. 8.

Each layer comprises nano-particles of sodium nano-silicate encapsulated within aluminium nano-particles, and the two layers are applied in turn.

In some embodiments, aircraft interior panels 80 are not provided with protective coating 88.

Figure 9:
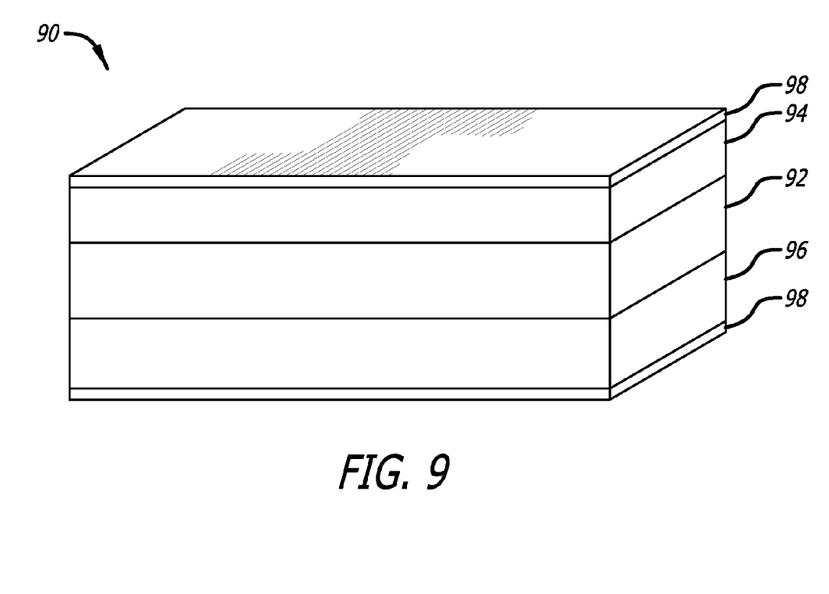
FIG. 9 is a perspective view of a green aircraft interior panel according to a fourth embodiment of the present invention.

FIG. 9 shows another embodiment of an aircraft interior panel 90 comprising a thermoplastic resin. The aircraft interior panel 90 comprises a core 92 sandwiched between an upper skin 94 and a lower skin 96. The outer surfaces of both the upper skin 94 and the lower skin 96 are provided with a protective coating 98, although in some cases only one of the skins 94 or 96 may need to be provided with a protective coating 98. In fact, in some embodiments, neither the upper skin 94 nor the lower skin 96 need to be provided with a protective coating 98.

The core 92 comprises a fire resistant thermoplastic foam. The core 92 may have a thickness of 4 to 5 mm. In alternative embodiments, the core 92 comprises a paper honeycomb. Paper honeycomb cores may have a thickness of 10 mm, or even greater. In alternative embodiments, the core 92 comprises balsa wood.

The upper skin 94 and lower skin 96 are of corresponding construction. They both comprise natural fibres, such as flax, set within a thermoplastic resin. The natural fibres may be as previously described with respect to FIGS. 2 and 3. The thermoplastic resin used in the embodiment of FIG. 9 is polylactic acid.

The composite matrix may be modified with a non-halogenated flame retardant. For example, ammonium polyphosphate (25% concentration), zinc borate (5% concentration) and nanographene (1% concentration) may be added to the polylactic acid matrix. Optionally, compatibilizers are also added to improve the incorporation of the flame retardants into the matrix. In addition, the natural fibres may be treated with a flame retardant, namely non-halogenated nano-particle flame retardants such as nano-phosphates thereby forming a protective coating over the natural fibres.

In the embodiment of FIG. 9, the upper skin 94 and lower skin 96 are both provided with the corresponding protective coatings 98. The protective coating 98 may be a fireproof nano-coating. The protective coating 98 may comprise nano-particles of sodium nano-silicate encapsulated within aluminium nano-particles, ammonium salts, nano-graphene, sodium carbonate or sodium silicate.

Further embodiments of methods of manufacture will now be described with reference to FIGS. 10 and 11. These methods of manufacture may be used to manufacture aircraft interior panels according to the present invention, and any of the embodiments of aircraft interior panels 20, 30, 80, 90 described above. However, the following methods are particularly preferred for the manufacture of aircraft interior panels according to the embodiments of FIGS. 8 and 9.

Figure 10:
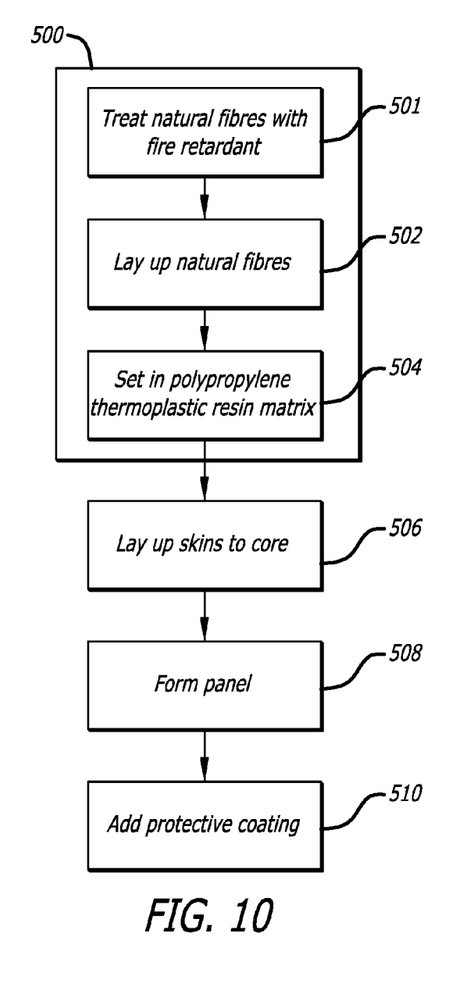
FIG. 10 is a schematic representation of a method of assembling a green aircraft interior panel according to a fifth embodiment of the method of the present invention.

A fifth embodiment of a method of manufacture of aircraft interior panels is shown in FIG. 10. As an example, it is described with respect to the aircraft interior panel 80 of FIG. 8, although the method may be applied to any aircraft interior panel constructed in accordance with the present invention. The method of manufacture of FIG. 10 is similar to that of FIG. 5 previously described. It is a two-stage panel assembly process, where the skins 84, 86 are first formed and then the complete aircraft interior panel 80 is assembled.

At 500, skins 84, 86 are formed. A first step 501 comprises treating the natural fibres, flax in this embodiment, with the fire retardant. For example, natural fibres may be formed into fabrics. The natural fibres may be immersed in a concentrated solution of fire retardant nano-particles (e.g., nano-phosphates). This retardant may be used with any aircraft interior panel in accordance with the present invention, including all the embodiments described herein. The natural fibres may be immersed for 30 seconds and then dried in an oven at 60 degrees Centigrade for 30 minutes. This treatment may be repeated several times to increase the concentration of flame retardant.

The method then continues at step 502 that comprises laying up the flame retardant coated natural fibre fabrics. For example, one layer of fabric is laid up for each skin 84, 86. At 504, a thermoplastic inorganic resin mix is used to impregnate the natural fibres. This resin mix comprises polypropylene resin (41% concentration) and, to increase fire resistance, ammonium polyphosphate (50% concentration) and nanographene (5% concentration) are added to the polypropylene matrix. A compatibilizer (4% concentration) may be added, such as a small concentration of Integrate NP 507-030 coupling agent to improve the compatibility between the matrix, the fire retardant additives and the natural fibre fabric. This resin mix may be extruded to obtain polymeric sheets 200 μm thick or less that are combined with the natural fibre fabrics.

To form the skins 84, 86, a flax fibre fabric may be sandwiched between a pair of the extruded sheets of resin mix. This laminate may then held at a temperature of 200 degrees Centigrade and a pressure of 87 kN for 1 minute, and the resulting skins 84, 86 may then be allowed to cool to room temperature.

With the skins 84, 86 formed in this manner, they are laid up on both sides of the core 82, as shown at step 506. A skin 84, 86 is placed on each side of the thermoplastic foam core 82, and a fire-proof adhesive is applied between the skin and the core surface. Polyurethane-based adhesives and epoxy-based adhesives are good choices for the adhesive. At 508, the complete aircraft interior panel 80 is formed by curing the adhesive.

At step 510, a protective coating may be added to the upper skin 84. First, the outer surface of the upper skin 84 may be activated by chemical etching, to allow improved adherence of the nano-coating to the outer surface. The nano-coating used in this embodiment comprises sodium silicate nano-particles encapsulated within aluminium nano-particles. This coating may be used with any aircraft interior panel in accordance with the present invention, including all the embodiments described herein. This coating may be applied to the activated outer surface of the upper skin 84 by manual impregnation of the surface with the nano-particle dissolution. A first layer may be applied and then dried in an oven at 40 degrees Centigrade for 10 minutes. Then, a second layer may be applied in the same way, and dried in an oven at 40 degrees Centigrade for 30 minutes. The aircraft interior panel 80 is thus complete.

The method of FIG. 10 may be adapted to form the aircraft interior panel 90 of FIG. 9, as follows.

At 600, skins 94, 96 are formed. At step 601 the natural fibres, flax in this embodiment, may be treated with fire retardant. For example, natural fibres may be formed into fabrics. The natural fibres may be immersed in a concentrated solution of fire retardant nano-particles (e.g. nano-phosphates). This retardant may be used with any aircraft interior panel in accordance with the present invention, including all the embodiments described herein. The natural fibres may be immersed for 30 seconds and then dried in an oven at 60 degrees Centigrade for 30 minutes, as has already been described with respect to FIG. 10. This treatment may be repeated several times to increase the concentration of flame retardant.

The method then continues at step 602 for laying up of the flame retardant coated natural fibre fabrics, such as by laying up one layer of fabric for each skin 94, 96. At 604, a thermoplastic inorganic resin mix is used to impregnate the natural fibres. In this embodiment, this resin mix comprises polylactic acid resin (69% concentration) and, to help fire resistance, aluminium polyphosphate (25% concentration), zinc borate (5% concentration) and nanographene (1% concentration) are added to the matrix. This resin mix may be extruded to obtain polymeric sheets 200 μm thick or less that are combined with the natural fibre fabrics.

To form the skins 94, 96, a flax fibre fabric may be sandwiched between a pair of the extruded sheets of resin mix. This laminate may then be held at a temperature of 140 degrees Centigrade and a pressure of 87 kN for 1 minute, and the resulting skins 94, 96 may then be allowed to cool to room temperature.

With the skins 94, 96 formed in this manner, they are laid up on both sides of the core 92, as shown at step 606. A skin 94, 96 is placed on each side of the thermoplastic foam core 92, and a fire-proof adhesive such as a polyurethane-based or epoxy-based adhesive, is applied between the skin and the core surface. At 608, the complete aircraft interior panel 90 is formed by curing the adhesive.

At step 610, protective coatings may be added to the upper and lower skins 94, 96. The method is as described at step 510 of FIG. 5. In summary, the outer surface of each skin 94, 96 may be activated by chemical etching and a nano-coating may be applied. The nano-coating of this embodiment comprises nano-particles of phosphates, ammonium salts, nanographene, carbonate and sodium silicate. A small quantity of acrylic resin may be added to improve the flexibility, adherence and thermal stability of the protective coating. This coating may be used with any aircraft interior panel in accordance with the present invention, including all the embodiments described herein. The coating may be applied in two layers by manual impregnation. A first layer may be applied and then dried for 10 minutes at 40 degrees Centigrade, and a second layer may be applied and dried at the same temperature for 30 minutes. The aircraft interior panel 90 is thus complete.

Figure 11:
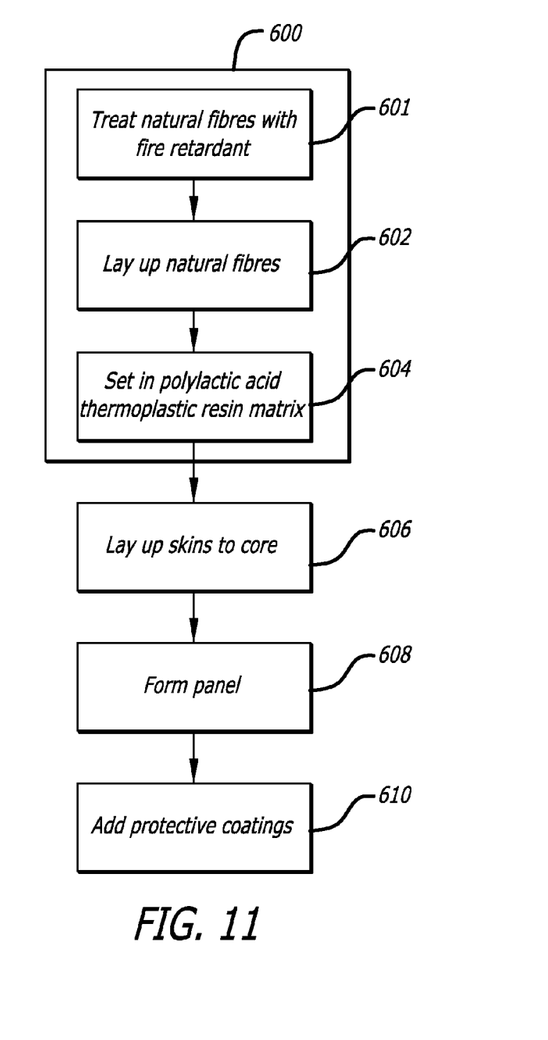
FIG. 11 is a schematic representation of a method of assembling a green aircraft interior panel according to a sixth embodiment of the method of the present invention.

The methods of manufacture described with respect to FIGS. 10 and 11 comprise two-stage panel assembly processes, where the skins 84, 86, 94, 96 are first formed and then the complete aircraft interior panels 80, 90 are assembled. However, these methods may be modified to a one-step formation processes where the skins 84, 86, 94, 96 and complete panels 80, 90 are cured in just a single process similar to as has already been described with respect to FIGS. 6 and 7.

It will be clear to the skilled person that variations may be made to the above embodiments without necessarily departing from the scope of the invention that is defined by the appended claims.

For example, the methods described above with respect to three-layer aircraft interior panels 20 may be readily adapted to more than three-layer aircraft interior panels. For example, the number of skin layers laid up on the core may be increased from one each side. More than a single core layer may also be included.

Various aircraft interior panels and various methods of manufacture have been described. It will be appreciated that the different methods may be applied to make any of the different panels described.

Examples

Example structures will now be described and their heat resistant behaviour presented.

The fire resistance of the skins were tested against the FAA and EASA requirements for aircraft interiors. Skins comprising an aluminium silicate derivative inorganic thermoset matrix and natural fibre composite, with the natural fibres containing in between 10 to 30% by weight boron derivative flame retardant, were exposed to radiant heat. Three samples were hung vertically in an environmental chamber. A constant air flow was passed through the chamber. The samples' exposures were determined by a radiant heat source adjusted to produce the desired total heat flux on the specimen of 3.5 W per cm$^2$. Combustion was initiated using a piloted ignition. The combustion products leaving the environmental chamber were monitored and used to calculate the release rate of heat.

Figure 12:
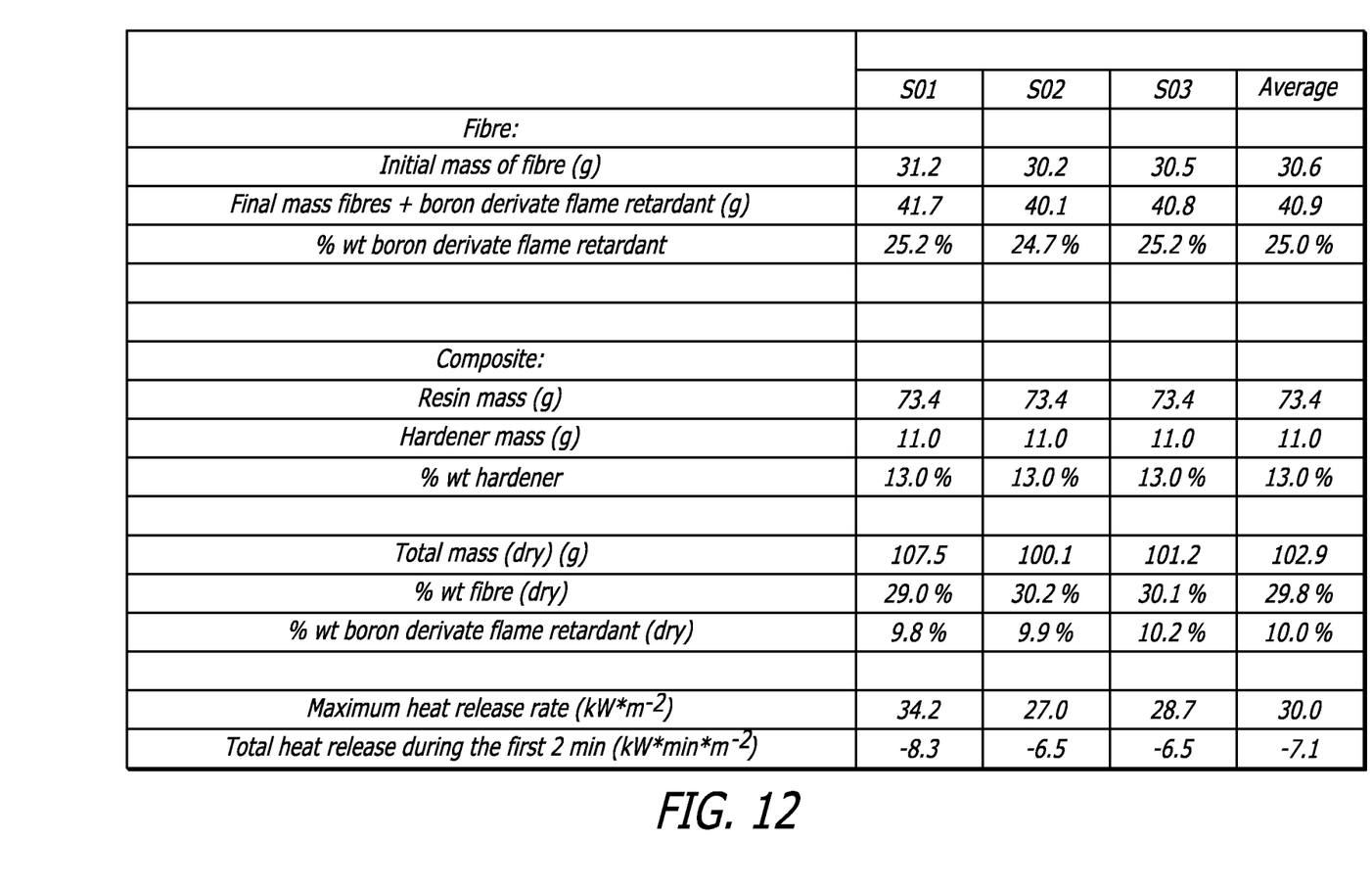
FIG. 12 is a table showing tests performed on the inorganic thermoset resin-based skins.
Figure 13:
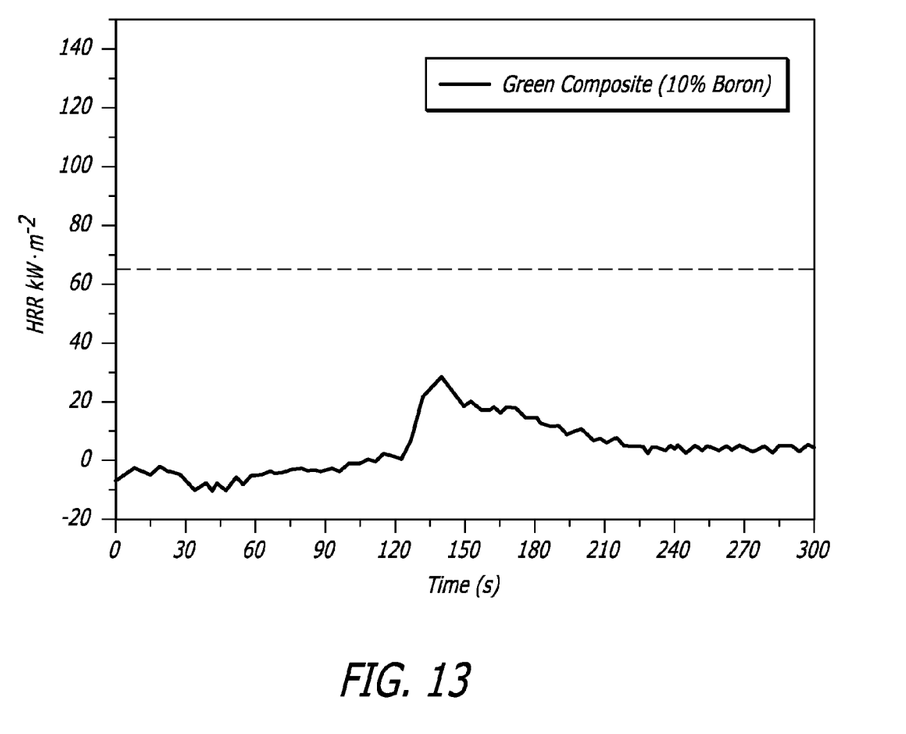
FIG. 13 is a graph showing tests performed on the inorganic thermoset resin-based skins of FIG. 12.

FIG. 12 is a table presenting the results for the three sample skins made of an inorganic thermoset resin. The heat release peak and the total heat release after two minutes are well within the limits set by the Federal Aviation Administration (FAA). FIG. 13 is a graph showing heat release with time for these samples.

Figure 14:
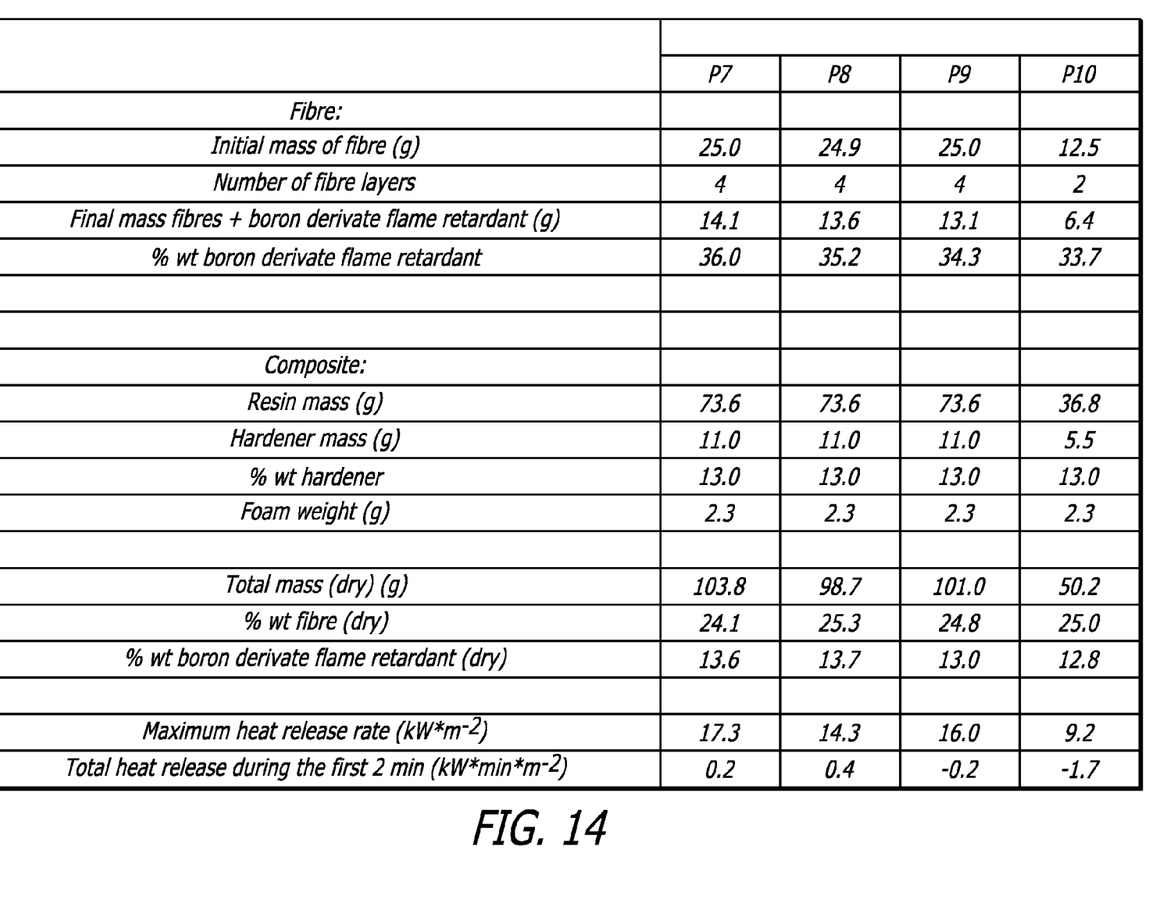
FIG. 14 is a table showing tests performed on inorganic thermoset resin-based aircraft interior panels.
Figure 15:
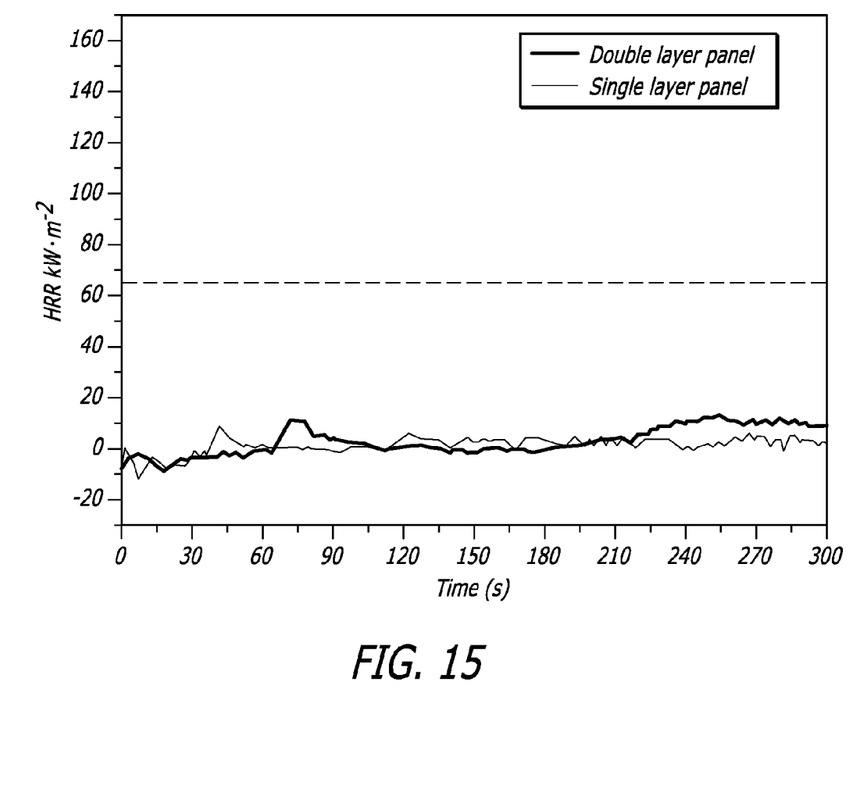
FIG. 15 is a graph showing tests performed on the inorganic thermoset resin-based aircraft interior panels of FIG. 14.

Four sandwich panels made of an inorganic thermoset resin were also constructed and tested. FIG. 14 is a table setting out the composition of each sandwich panel, along with the results of the heat release tests. The tests were performed in the same way as for the skin samples described above. Again, the peak and total heat release was found to be well within the FAA requirements. FIG. 15 is a graph of heat release with time.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. An aircraft interior panel, comprising:
   a core sandwiched between a first skin and a second skin, wherein the first skin and the second skin both comprise a composite comprising a composite matrix of natural fibres set within a resin,
   wherein the natural fibres are pretreated with a single flame retardant prior to being set in the resin, and
   wherein the flame retardant consists of disodium octoborate tetrahydrate.

2. The aircraft interior panel of claim 1, wherein the natural fibres are flax.

3. The aircraft interior panel of claim 1, wherein the resin is an inorganic thermoset resin.

4. The aircraft interior panel of claim 3, wherein the inorganic thermoset resin comprises an aluminum silicate derivative.

5. The aircraft interior panel of claim 1, wherein the resin is a thermoplastic resin.

6. The aircraft interior panel of claim 5, wherein the thermoplastic resin comprises one of polypropylene or polylactic acid.

7. The aircraft interior panel of claim 1, wherein a flame retardant protective coating is on an outer surface of at least one of the first skin or the second skin.

8. The aircraft interior panel of claim 7, wherein the resin comprises polypropylene and the protective coating comprises sodium silicate nanoparticles encapsulated within aluminum nanoparticles.

9. The aircraft interior panel of claim 7, wherein the resin comprises polylactic acid and the protective coating comprises nanoparticles of at least one of phosphates, ammonium salts, nanographene, carbonate, or sodium silicate.

10. The aircraft interior panel of claim 1, wherein the core comprises one of a paper honeycomb or a thermoplastic foam.

11. The aircraft interior panel of claim 10, wherein the thermoplastic foam is a fire resistant thermoplastic foam.

12. The aircraft interior panel of claim 11, wherein the fire resistant thermoplastic foam is a polyvinylidene fluoride foam.

13. The aircraft interior panel of claim 1, wherein the core has been activated to enhance adhesion to the first skin and the second skin.

14. The aircraft interior panel of claim 13, wherein the core has been activated to enhance adhesion by one of a dielectric barrier discharge process, a chemical etching, or using an adhesive.

15. An aircraft, comprising:
at least one aircraft interior panel,
wherein the at least one aircraft interior panel comprises:
a core sandwiched between a first skin and a second skin,
wherein the first skin and the second skin both comprise a composite comprising a composite matrix of natural fibres set within a resin,
wherein the natural fibres are pretreated with a single flame retardant prior to being set in the resin, and
wherein the flame retardant consists of disodium octaborate tetrahydrate.

16. A method of manufacturing an aircraft interior panel, the method comprising:
laying up natural fibres;
impregnating the natural fibres with a resin;
curing the natural fibres and the resin to form a first skin and a second skin;
laying up the first skin and the second skin on each side of a core to form a stack; and
curing the stack to form the aircraft interior panel,
wherein the natural fibres are pretreated with a single flame retardant prior to being impregnated with the resin, and
wherein the flame retardant consists of disodium octaborate tetrahydrate.

17. The method of claim 16, wherein the laying up the first skin and the second skin on each side of the core to form a stack and the curing the stack to form the aircraft interior panel are performed in one step.

18. The method of claim 16, wherein the curing is performed by using one of a vacuum bag process, a mechanical press, and an autoclave.

19. The method of claim 16, wherein the method further comprises providing a flame retardant protective coating on an outer surface of at least one of the first skin and the second skin.

20. The method of claim 16, wherein the method further comprises activating the surface of the core to improve adhesion of the core to the first skin and the second skin.

21. The method of claim 16, wherein the method further comprises using adhesives to improve adhesion of the core to the first skin and the second skin.

* * * * *

UNITED STATES PATENT AND TRADEMARK OFFICE
CERTIFICATE OF CORRECTION

PATENT NO. : 9,782,944 B2  
APPLICATION NO. : 13/323790  
DATED : October 10, 2017  
INVENTOR(S) : Pedro P. Martin et al.

Page 1 of 1

It is certified that error appears in the above-identified patent and that said Letters Patent is hereby corrected as shown below:

On the Title Page

Item (75) Inventors:, change "Pedro P. Martin, Madrid (ES); Ana Gonzalez-Garcia, Madrid (ES); Nieves Lapena, Madrid (ES), Sergio Fita Bravo, Madrid (ES); Vicent Martinez Sanz, Madrid (ES); Ferran Marti Ferrer, Madrid (ES)"

To --Pedro P. Martin, Madrid (ES); Ana Gonzalez-Garcia, Madrid (ES); Nieves Lapena, Madrid (ES), Sergio Fita Bravo, Madrid (ES); Vincent Martinez Sanz, Madrid (ES); Ferran Marti Ferrer, Madrid (ES); Amelia Martinez Alonso, Oviedo (ES); Tomas Gonzalez Rodriguez, Oviedo (ES)--.

Signed and Sealed this  
Third Day of April, 2018

Andrei Iancu  
*Director of the United States Patent and Trademark Office*